United States Patent [19]

Rowland et al.

[11] 4,360,492

[45] Nov. 23, 1982

[54] METHOD OF AND APPARATUS FOR LUBRICATING CABLE DURING CONTINUOUS DRY CURING

[75] Inventors: Bobby A. Rowland; Roy E. Sullivan, both of Carrollton, Ga.; William R. Dodson, Ranburne, Ala.; Steve C. Bohannon, Newnan, Ga.

[73] Assignee: Southwire Company, Carrollton, Ga.

[21] Appl. No.: 204,095

[22] Filed: Nov. 5, 1980

[51] Int. Cl.³ .......................... B29D 3/00; B29H 5/07
[52] U.S. Cl. .................................... 264/40.1; 264/130; 264/132; 264/174; 264/213; 264/236; 264/237; 264/255; 264/347
[58] Field of Search .............. 264/213, 236, 347, 174, 264/40.1, 130, 237, 255, 132; 425/113, 122, 90, 104, 378 R, 384, 404, 445, 446, 72 R, 505, 506, 508, 516

[56] References Cited

U.S. PATENT DOCUMENTS

| | | | |
|---|---|---|---|
| 2,023,665 | 12/1935 | Clayton | 264/347 |
| 3,054,142 | 9/1962 | Hinderer et al. | 264/174 |
| 3,446,883 | 5/1969 | Garner | 264/174 |
| 3,666,876 | 5/1972 | Forster | 174/120 SC |
| 3,846,528 | 11/1974 | Chrisman et al. | 264/347 |
| 3,868,436 | 2/1975 | Ootsuji et al. | 264/174 |
| 3,928,525 | 12/1975 | Fuwa et al. | 264/174 |
| 4,220,615 | 9/1980 | Sommarlund | 174/120 SC |
| 4,222,980 | 9/1980 | Stauffer et al. | 264/347 |
| 4,247,504 | 1/1981 | Karpo | 264/174 |

Primary Examiner—Willard E. Hoag
Attorney, Agent, or Firm—Herbert M. Hanegan; Stanley L. Tate; Robert S. Linne

[57] ABSTRACT

Disclosed is a method and apparatus for continuously lubricating cable during continuous dry curing of cable insulation to reduce friction between the cable insulation and the dry curing apparatus, thereby eliminating cable oscillation and vibration to increase product quality and the speed of production.

8 Claims, 6 Drawing Figures

METHOD OF AND APPARATUS FOR LUBRICATING CABLE DURING CONTINUOUS DRY CURING

BACKGROUND OF THE INVENTION

In the cable making art there are generally two types of insulation and/or jacket material used in the fabrication of electrical wire and cable, thermosetting materials and thermoplastic materials. The application of thermoset materials as the insulation or jacket of an electrical wire or cable requires the use of vulcanization (curing) apparatus to cause the thermosetting reaction to occur. Until recently the most widely accepted technique of manufacturing extruded vulcanized type cables was to pass the conductor though a series of extruder heads and apply concentrically the semiconducting, and insulating compounds. After application of the semiconducting and insulating compounds, the cables are vulcanized (cured) under pressure in a saturated steam environment followed by cooling under pressure. In such a steam curing process, the insulated conductor is moved through the vulcanizer and exposed to pressurized (typically 250 psi) saturated steam followed by cooling under pressurized water (typically 250 psi). The thermosetting compound contains curing agents which are activated at the high temperatures found within the vulcanizer with the speed of the vulcanization reaction depending on the temperature within the vulcanizer (for 250 psi steam, approximately 210° C.).

The steam curing process has been used in horizontal, vertical, slant and catenary installations. Long length curing pipes have been demonstrated to be preferred by those practicing the art of steam curing cables, this is so because polyethylene and ethylenepropylene rubber insulations characteristically have high thermal resistances and therefore, heavily insulated cables of the type used for high voltage operation take a long time to cure. In addition to the problems of low cure rates and corresponding low production rates achieved using steam cure processes, is the problem created by the required exposure of the cable insulation to high pressure steam which has been shown to penetrate the insulation and to create microscopic cavities or voids within the insulation. Such voids limit or even reduce the dielectric strength of the cured insulation. In order to eliminate these and other problems associated with steam curing cable insulation, a number of different systems have been proposed, among these systems are those disclosed and claimed in U.S. Pat. Nos.: 3,635,621; 3,868,463; 3,901,633; 4,043,722; 4,069,286 and 4,080,131. The most significant system uses high temperature and pressure inert gases to cure the insulation and a dry cooling process to cool the cured insulation. While the transition to dry-cure vulcanization systems has improved the electrical properties of the vulcanizate, it has been found that additional problems have been created by abandoning the use of steam as the vulcanization heat source. Chief among the new problems encountered when a dry-cure/dry-cool vulcanization system is used in all but a full catenary arrangement is an oscillation or vibration of the cable which occurs as the extruder-vulcanizer production rate is increased past a critical point for the particular equipment being used. This oscillation causes a ripple effect in the insulation being applied because the cable is mechanically unstable as it passes through the extrusion die and therefore incapable of following a constant path as it moves through the extruder die. This oscillation also causes the insulation to be abraded by contact with the inner wall of the vulcanization tube. It has been found that this phenomenon is agravated when a tandem extrusion process is used to apply both the insulation and insulation shield so that only one pass through the vulcanizer is required to cure both the insulation and insulation shield and conversely, its effects are mitigated if separate passes through the extrusion apparatus are used for the application of the vulcanization of the cable insulation on the first pass and the insulation shield on the second pass. In accordance with the present invention it has been determined that the cause of the oscillation/vibration problem was related to the extrusion sequence in that when tandem extrusion is not used certain organic by-products of the curing reaction are discharged by the cable insulation and condensed on the interior walls of the vulcanization apparatus.

When a tandem extrusion process is used to extrude the insulation shield over the insulation prior to vulcanization these same cure reaction by-products are trapped inside the insulation by the insulation shield. When the by-products were analyzed they were found to contain about 57% acetophenone, 21% cumyl alcohol, 10.5% methylstyrene, 1.8% cumene and 9.7% unknown. It was finally determined that the condensed decomposition products served as a lubricant to reduce the co-efficient of friction between the interior walls of the vulcanization tube and the cable insulation thereby reducing frictional drag and preventing oscillation of the cable much as would the saturated steam of a steam cure system. It was found in a dry cure vulcanization system without lubrication, the moving cable tends to momentarily stick at points of contact with the vulcanization apparatus and then after tension on the cable increases to a point at which the static component of the friction force is overcome the cable slides forward until the decreasing tension is less than the Kenetic component of the frictional force at which time the cable momentarily sticks again. This processes is continuously repeated until the insulation is no longer in contact with the interior walls of the curing tube. This is sometimes called a slip-stick phenomenon and is readily seen on a half, semi catenary slant or horizontal vulcanization line where the dry cable insulation touches the bottom of the hot, dry tube inner surface. Interaction of the dry surfaces of these two create oscillation of the cable catenary resulting in vibration which severly limits cable quality and process production rate.

SUMMARY OF THE INVENTION

The present invention solves the friction and vibration problems associated with dry curing systems by introducing a method and apparatus for continuously reducing the coefficient of friction between the cable insulation or insulation shield and the interior wall of a continuous vulcanization tube of the type used to cure cable and heavy wall cable insulation by the dry cure-dry cool process.

Thus it is a major object of the present invention to provide a method and apparatus for continuously lubricating cable during continuous vulcanization of cable insulation thereby reducing friction between the cable insulation and the dry curing apparatus.

Another object of this invention is to eliminate cable oscillation and vibration between the extruder which insulates the cable and the reel upon which the finished product is wound as it exits the vulcanization apparatus.

Still another object of this invention is to increase cable quality and productivity.

Yet another object of the present of invention is to increase the productivity of methods of and apparatus for producing thermoset insulated wire and cable.

BRIEF DESCRIPTION OF THE DRAWINGS

While the specification concludes with claims particularly pointing out and distinctly claiming the subject matter which is regarded as the invention, it is believed that the invention, objects, features and advantages thereof will be better understood from the following description taken in connection with the accompanying drawings wherein:

DESCRIPTION OF THE PREFERRED EMBODIMENT

Figure 1:
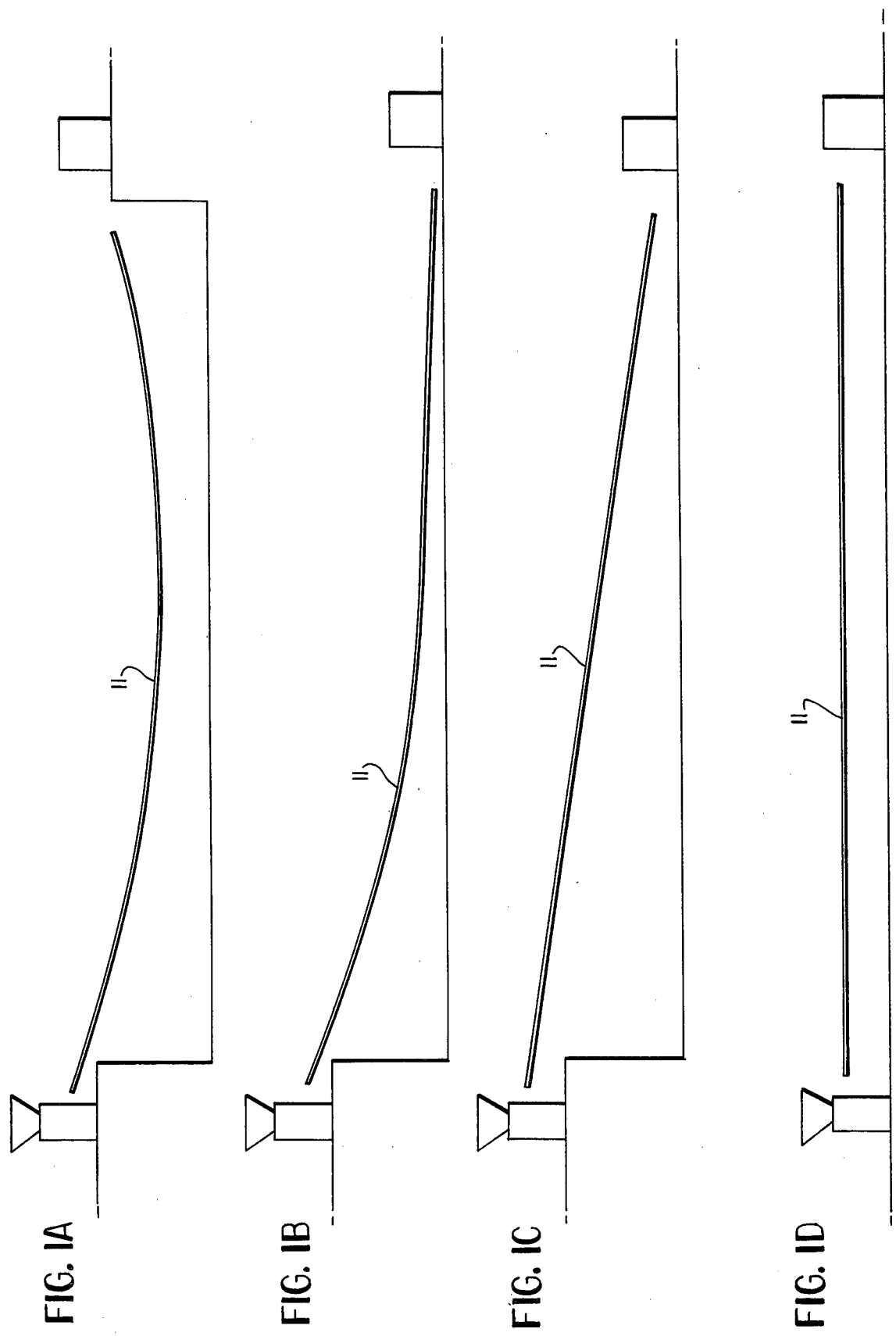
FIG. 1a is a schematic-elevational view of a continuous vulcanization system.
FIG. 1b is a schematic-elevational view of a continuous vulcanization system.
FIG. 1c is a schematic-elevational view of a continuous vulcanization system.
FIG. 1d is a schematic-elevational view of a continuous vulcanization system.

FIGS. 1a, 1b, 1c, and 1d illustrate schematically the general vulcanization tube configurations available for use with either a saturated steam vulcanization medium or with dry cure systems using a hot inert gas vulcanization medium. FIG. 1a illustrates a full catenary line, FIG. 1b illustrates a half catenary line, FIG. 1c illustrates a slant configuration and FIG. 1d illustrates a line having a horizontal configuration. It can readily be seen from an examination of FIGS. 1 that with the exception of the full catenary system the cable having insulation applied and cured will always touch the interior walls of the vulcanization tube at some point along its path through the vulcanization tube because the normal curve followed by a conductor stretched between two points is a catenary curve. At this point 12 as seen in more detail in FIG. 2, the moving cable 10 will momentarily stick to the interior wall 13 of the vulcanization tube 11. As the forward motion of cable 10 stops for this instant, tension on the cable will increase to an amount which is greater than the static component of the frictional force retarding the movement of cable 10 through vulcanization tube 11. When this amount of tensional force is applied to cable 10, the cable will resume its forward progress through vulcanization tube 11 until the tensional force is less than the kinetic component of the frictional force created by the touching of the cable and the interior wall of vulcanization tube 11 at which point the forward progress of cable 10 through tube 11 will again stop and the process will be repeated until increment by increment of cable 10 passes point 12. The frictional force which retards the progress of cable 10 through tube 11 is proportional to the coefficient of friction of the materials in contact (the inner wall of vulcanization tube 11 and the insulation or insulation shield of cable 10). This stick-slip-stick phenomenon causes cable 10 to oscillate or vibrate along its entire length thereby causing the path of cable 10 through tip and die assembly 31 of FIG. 3 to vary and results in an irregular extrudate surface.

Figure 2:
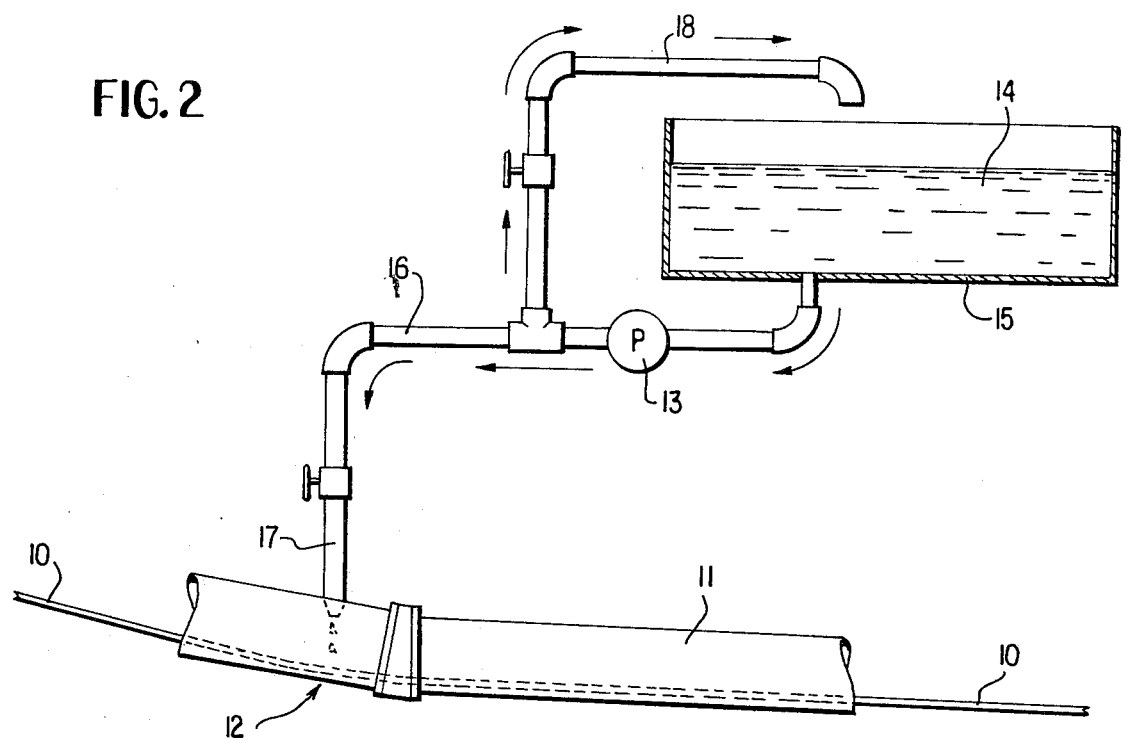
FIG. 2 is an elevation of the preferred apparatus of the present invention.
Figure 3:
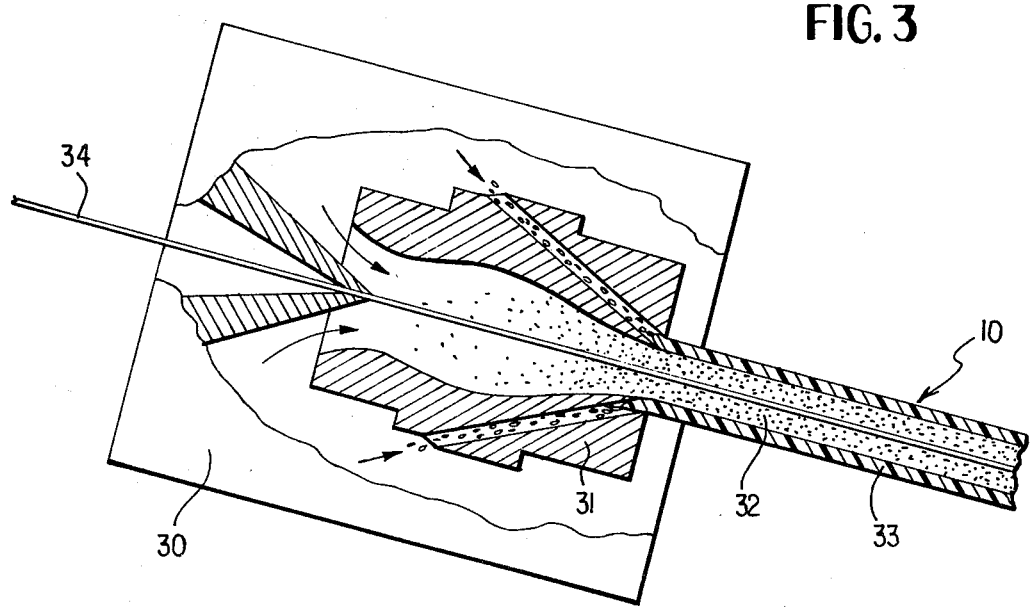
FIG. 3 is a schematic cross sectional view of a wire conductor as it passes through an extrusion die.

As FIG. 2 illustrates in more detail, the function of the present invention, cable 10 contacts the inner surface of the vulcanization line 11 at a touch down point 12. Since the vulcanization line 11 is pressurized, a small high pressure pump 13 is used to force lubricant 14 from a reservoir 15 (heated if required) through a piping system 16 to a lubricant injection device 17 which introduces small quantities of lubricant 14 into the vulcanization line 11 at the touch down point 12. This lubricant reduces the coefficient of friction between the cable 10 and the interior wall of vulcanization tube thereby reducing the frictional forces which would retard the forward progress of cable 10 through vulcanization tube 11. This reduction in frictional forces allows cable 10 to pass freely through vulcanization tube 11 without experiencing the friction induced oscillation or vibration described above thereby permitting optimum production rates to be achieved. Additionally the cable produced using the tandem extrusion technique previously described contains the by products of the chemical crosslinking reaction which have been found to improve the electrical "tree resistance" properties of the cable over that of similar cables produces by a multiple pass extrusion/vulcanization process. A by-pass 18 is provided for return of excess lubricant 14 to the resevoir 15. Thus, friction induced oscillation and vibration are eliminated and the electrical tree resistance of cable produced by the method of the present invention is improved.

The quantity of lubricant 14 used can be varied from about 0.001 liter to about 1000 liters per hour, preferably 1 liter to 10 liters per hour depending on production speed and type of lubricant 14 used. Several lubricants 14 have been found compatible with cable 10 insulation surface. Among them are: alkylaryl polysiloxane, polydimethyldiphenylsiloxane, water-dilutable siloxane emulsion, polydimethyl-siloxane, water-dilutable silicone emulsion, glycerol, polyalkylene glycol, trihydroxhexane, polyethylene glycol, polyethylene propylene glycol, aluminum stearates, zinc stearates, stearic acids, animal detergents, vegetable detergents, and mixtures thereof. The preferred lubricant 14 is flax detergent characterized by pH in 1% solution of 11.9 to 12.5, low foaming, free and complete rinsing, hard water stability up to 500 ppm, biodegradable, 160° F. minimum operating temperature, and 180° F. maximum operating temperature.

Application of this lubricant 14 by the apparatus of this invention reduces friction to protect the cable surface, provides the advantage of a tight, wear resistant seal (not shown) where the cable 10 exits the line 11 to prevent loss of pressure, and allows increase in production speed. Quality and productivity are thus increased.

It is preferred that the bare elongated electrical conductor advance along a predetermined straight path through a first extruder head (not shown) which concentrically extrudes semiconductor strand shield thereon. This shielded conductor 34 should then pass through tandem defect detection apparatus (not shown) which detects defects in the strand shield. The tested conductor 34 advances along a predetermined straight path through the tandem second extruder head 30 of FIG. 3 which concentrically extrudes primary insulation 32 thereon in a first extrusion plane and simultaneously and concentrically extrudes an ironed insulation shield 33 thereon in a second extrusion plane. Referring again to FIG. 2, the insulated and shielded conductor 10 then passes along a substantially catenary path through the pressurized vulcanization means 11 in tandem relationship with the second extruder head 30 of FIG. 3 where curing occurs in the pressurized, hot, dry medium. After cooling of the cured conductor 10 in an environment substantially free of water or other liquid coolant the finished conductor 10 is removed from the vulcanization means 11. Defects previously detected are then marked on the finished electrical conductor 10 for future identification and the conductor 10 is collected on a cable storage means (not shown).

The finished electrical conductor of this invention is an insulated cable product having in solution in the insulation matrix the decomposition products of the vulcanization reaction consisting of a mixture containing about 57% acetophenone, 21% cumyl alcohol, 10.5% methlstysene, 1.8% cumene and 9.7% unknown compounds, and it is characterized by an increased resistance to electrical treeing.

While this invention has been described in detail with particular reference to a preferred embodiment thereof, it will be understood that variations and modifications can be effective within the spirit and scope of the invention as described herein before and as defined in the appended claims.

What is claimed is:

1. A method of continuously fabricating finished electrical conductor comprising the steps of:
   (a) advancing an elongated electrical conductor along a predetermined straight path through a first extruder head;
   (b) concentrically extruding semiconductor strand shield onto said advancing conductor;
   (c) advancing said shielded conductor along a predetermined straight path through a second extruder head in tandem relationship with said first extruder head;
   (d) concentrically extruding primary insulation onto said advancing shielded conductor in a first extrusion plane within said second extruder;
   (e) simultaneously and concentrically extruding an insulation shield onto said shielded and insulated conductor in a second extrusion plane within said second extruder;
   (f) advancing said shielded, insulated and insulation shielded conductor along a predetermined substantially catenary path through a pressurized vulcanization means in tandem relationship with said second extruder head such that said shielded, insulated and insulation shielded conductor contacts the interior surface of said vulcanization means at a point remote from said second extruder head;
   (g) simultaneously curing the strand shield, insulation and insulation shield of said conductor in a hot, dry medium within said vulcanization means;
   (h) introducing lubricant into said vulcanization means under pressure at the point where said conductor contacts the interior surface of said vulcanization means;
   (i) cooling said conductor when cured within said vulcanization means in an environment substantially free of water or other liquid coolant to form a finished electrical conductor;
   (j) removing finished electrical conductor from said vulcanization means; and
   (k) collecting the finished electrical conductor on a cable storage means.

2. The method of claim 1 wherein said lubricant introduced into said vulcanization means under pressure is selected from a group comprising: alkylaryl polysiloxane, polydimethyldiphenylsiloxane water-dilutable siloxane emulsion, polydimethyl-siloxane, water-dilutable silicone emulsion, glycerol, polyalkylene glycol, trihydroxyhexane, polyethylene glycol, polyethylene propylene glycol, aluminum stearate zinc stearate stearic acid animal detergents, vegetable detergents, and mixtures thereof.

3. The method of claim 1 wherein continuous fabrication of finished electrical conductor further comprises advancing said sheilded conductor along a predetermined straight path through an apparatus for detecting defects in said semiconductor strand shield, said detection apparatus being interposed between said first extruder head and said second extruder and in tandem relationship therewith.

4. The method of claim 3 wherein continuous fabrication of a finished electrical conductor further comprises detecting defects in said semiconductor strand shield.

5. The method of claim 4 wherein continuous fabrication of finished electrical conductor further comprises marking the location of detected defects on the finished electrical conductor for later identification.

6. The method of claim 1 including the additional step of providing a tight, wear resistant seal at the point where the conductor exits the dry curing apparatus to prevent loss of pressure.

7. The method of claim 5 wherein the step of introducing lubricant into said vulcanization means under pressure comprises applying said lubricant to said conductor at a rage of from about 0.001 liter to about 1000 liters per hour.

8. The method of claim 7 wherein lubricant is applied at rate of from about 1 liter to about 10 liters per hour.

* * * * *